(12) United States Patent
Ahlen et al.

(10) Patent No.: US 8,028,711 B2
(45) Date of Patent: Oct. 4, 2011

(54) HOT TAP CLAMP

(75) Inventors: Carl Henrik Ahlen, Trondheim (NO); Jan Olav Berge, Haugesund (NO); Kjell Edvard Apeland, Sveio (NO); Michael Armstrong, Otley (GB)

(73) Assignee: Statoil ASA, Stavanger (NO)

( * ) Notice: Subject to any disclaimer, the term of this patent is extended or adjusted under 35 U.S.C. 154(b) by 479 days.

(21) Appl. No.: 11/577,136

(22) PCT Filed: Oct. 11, 2005

(86) PCT No.: PCT/NO2005/000374
§ 371 (c)(1),
(2), (4) Date: May 18, 2009

(87) PCT Pub. No.: WO2006/041307
PCT Pub. Date: Apr. 20, 2006

(65) Prior Publication Data
US 2009/0229681 A1   Sep. 17, 2009

(30) Foreign Application Priority Data

Oct. 12, 2004   (NO) .................................... 20044309

(51) Int. Cl.
*F16L 55/18*   (2006.01)
(52) U.S. Cl. ....................... 137/15.12; 137/317; 285/197
(58) Field of Classification Search .................. 137/317, 137/318, 15.12, 15.13; 285/197
See application file for complete search history.

(56) References Cited

U.S. PATENT DOCUMENTS

| | | | | |
|---|---|---|---|---|
| 4,050,720 A * | 9/1977 | Reneau | .......................... | 285/197 |
| 4,223,925 A * | 9/1980 | Reneau et al. | ................. | 285/197 |
| 5,186,755 A * | 2/1993 | Carlson, Jr. et al. | .......... | 118/641 |
| 5,590,913 A * | 1/1997 | Morris et al. | ................. | 285/197 |
| 5,653,477 A * | 8/1997 | Waterman | ................... | 285/136.1 |
| 5,842,496 A * | 12/1998 | Delanty et al. | ................ | 137/318 |
| 5,988,199 A * | 11/1999 | Ryan et al. | ..................... | 137/318 |
| 6,578,877 B1 * | 6/2003 | Sundholm | ..................... | 285/197 |
| 7,441,993 B2 * | 10/2008 | Evans | ........................... | 137/318 |
| 2004/0089342 A1 | 5/2004 | Vennemann et al. | | |
| 2004/0120779 A1 | 6/2004 | Evans | | |

FOREIGN PATENT DOCUMENTS

| | | |
|---|---|---|
| EP | 235917 A1 | 9/1987 |
| EP | 304246 A1 | 2/1989 |
| GB | 2040202 A | 8/1980 |
| NO | 314467 | 12/2002 |
| WO | 00/60262 | 10/2000 |
| WO | 03/002902 A1 | 1/2003 |

* cited by examiner

*Primary Examiner* — Kevin Lee
(74) *Attorney, Agent, or Firm* — Senniger Powers LLP

(57) ABSTRACT

A hot tap clamp. The clamp includes a first clamp part, a second clamp part, a fastener for stable fastening of the clamp parts around a section of a pipeline provided with a hot tap coupling, a pipe socket fixedly integrated with one of the clamp parts at an inner end and extending outward from the clamp part to an outer end, a hub on the outer end of the pipe socket, the pipe socket at the inner end going through the clamp part abutting the surface of the pipeline, such that the pipe socket can be sealingly welded to the pipeline by internal welding.

8 Claims, 2 Drawing Sheets

HOT TAP CLAMP

FIELD OF THE INVENTION

Figure 1A:
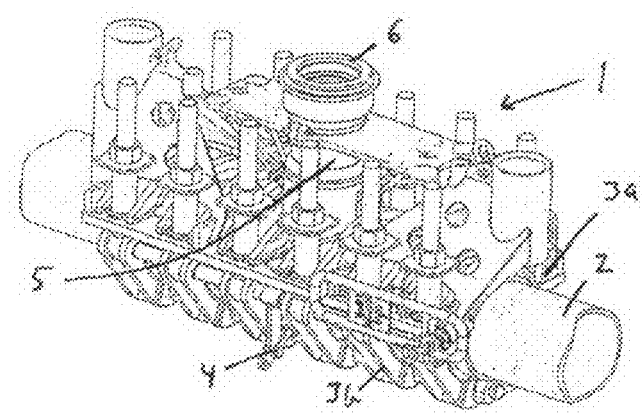

The present invention relates to establishment of a branching-point in a pipeline containing fluid under pressure. More specifically, the invention relates to a hot tap clamp for establishment of a branching-point in a pipeline.

BACKGROUND OF THE INVENTION

The term "hot tap" denotes establishment of a branching-point or a coupling point in a pipeline carrying fluid under pressure, without prior shutdown of the pipeline. A typical utilisation will be to connect a gas pipeline from a newly developed gas field to an existing gas pipeline, which results in significant savings compared to arranging a separate infrastructure for delivery of gas from the new gas field, particularly if the installations are located sub sea.

A hot tap operation represents no disadvantage for fluid-transport through the existing pipeline, as the operation is maintained all the time. By operation sub sea, ingress of water into the pipeline is avoided, as well as a subsequent costly pigging operation to remove the water. Likewise, corrosion problems caused by water, filling of an existing sub sea pipeline are avoided.

A number of arrangements exist for hot tapping, which have been used successfully over several years. So far the commercially available arrangements for sub sea hot tapping have required assistance from divers. There is a demand for hot tapping equipment for operation without assistance by divers, particularly for water depths deeper than 180 m, which is the maximal depth for planned diving operations in Norwegian waters.

An example of hot tap equipment is found in the Patent Application Publication US 2004/0089342 A1, where a method and an arrangement are described for friction stitch welding of a branch coupling to an existing pipeline. After the welding, openings are machined through the wall of the existing pipeline to complete the hot tap coupling. Seam stitch welding has a disadvantage of relatively low mechanical strength and utilisation of relatively complicated equipment. A demand exists for simplified equipment for hot tap operations.

Other examples of equipment for hot tap operations are described in the Patent Publications NO. 3144467, WO 00/60262, EP 235917, EP 304246 and EP 235917.

SUMMARY OF THE INVENTION

With the present invention the above-mentioned demands are met, by providing a hot tap clamp, comprising
a first clamp part,
a second clamp part,
means for stable fastening of the clamp parts around a section of a pipeline that shall be provided with a hot tap coupling,
a pipe socket fixedly integrated with one of the clamp parts at an inner end and extending outwards from the clamp part to an outer end,
a hub on the outer end of the pipe socket,
distinguished in that the pipe socket at the inner end is going through the clamp part abutting the surface of the pipeline, such that the pipe socket can be sealingly welded to the pipeline by internal welding.

Stable fastening of the clamp parts means that fastening and dimensioning are such that forces applied by the branch pipeline or other equipment that shall be connected, do not result in malfunction for the hot tap clamp. With a pipe socket that at an inner end is fixedly integrated with one of the clamp parts, it is meant that the pipe socket is welded or fastened in another way to the clamp part such that a very stiff connection is achieved, such that forces acting on the pipe socket is taken up by the connection between the pipe socket and the clamp part, without being taken up by the weld against the pipeline to a significant extent. The pipe socket can preferably be totally integrated with the clamp part by being machined out from the same casted or forged steel part. That the pipe socket at an inner end goes through the clamp part, means that the pipe socket goes through the clamp part. The inner end of pipe socket abuts to the surface of the pipeline, which means that the inner end is arranged in an appropriate position for welding to take place between the inner end and the surface of the pipeline. Internal welding means that welding takes place from the inside of the pipe socket. A hub on the outer end of the pipe socket means a mechanical coupling part of any appropriate type for establishment of a coupling for forming a hyperbaric chamber in the pipe socket, a chamber for completing the coupling by machining through the surface of the pipeline, having mechanical stability for connection of a branch pipeline or optionally other equipment.

The hot tap clamp can be used on land or sub sea, but is particularly considered for use sub sea. The hot tap clamp preferably comprises seals and a feedthrough for fluid evacuation, such that the pipe socket by use of connected equipment easier can be evacuated for water to provide function as a hyperbaric welding chamber. That way the hot tap clamp is used for establishment of a coupling in a sub sea pipeline. More specifically, this is achieved by connecting equipment to the hub on the outer end of the pipe socket to evacuate water from the pipe socket through the feedthrough for fluid evacuation, such that an atmosphere for hyperbaric welding can be established and maintained. Preferably the same gas mixture and equipment are used for both evacuation of sea water and for establishment and maintenance of an appropriate welding atmosphere. The seals and the feed through for fluid evacuation are placed sufficiently away from the welding area to avoid heating to a temperature above maximum operating temperature. Two feedthroughs are preferably arranged, one on each side of the pipe socket, preferably with a check valve in each feedthrough.

The equipment for hyperbaric welding, including equipment for atmosphere control, and equipment for completing the hot tap coupling, are preferably connected to the hub sequentially, one after the other, optionally with one coupling by use of a rotating tool system. After completing the weld and after accepted pressure testing and other non-destructive testing, the hot tap coupling is completed by milling out the pipeline surface inside the weld.

The hot tap clamp is preferably equipped with induction heaters to preheat the welding area. The means for induction heating can be arranged around the welding head, external or internal on the pipe socket, or internal or external on the clamp part around the pipe socket. Alternatively, equipment for resistance heating of the welding area can be used.

The pipe socket is preferably provided with increased internal diameter in the inner end, to provide space for sufficient number of weld seams in the transition between the pipe socket and the surface of the pipeline without limiting the flow cross section. So the properties for flow and pigging operations are maintained.

Automated equipment of previously known type are preferably used for hyperbaric welding and completion of the hot tap coupling.

BRIEF DESCRIPTIONS OF THE DRAWINGS

Figure 1B:
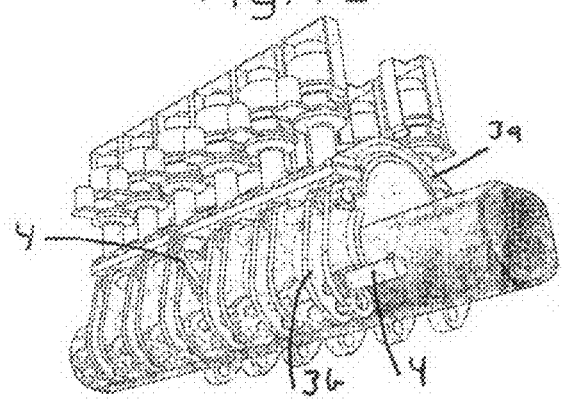
Figure 1C:
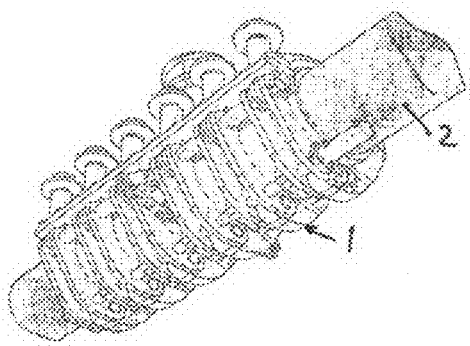
Figure 2B:
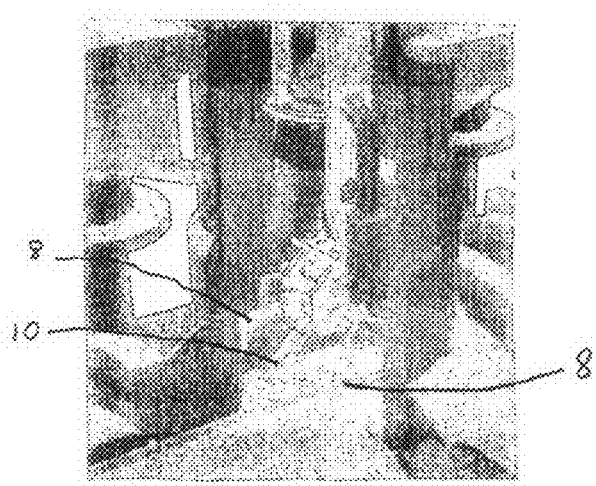
Figure 2A:
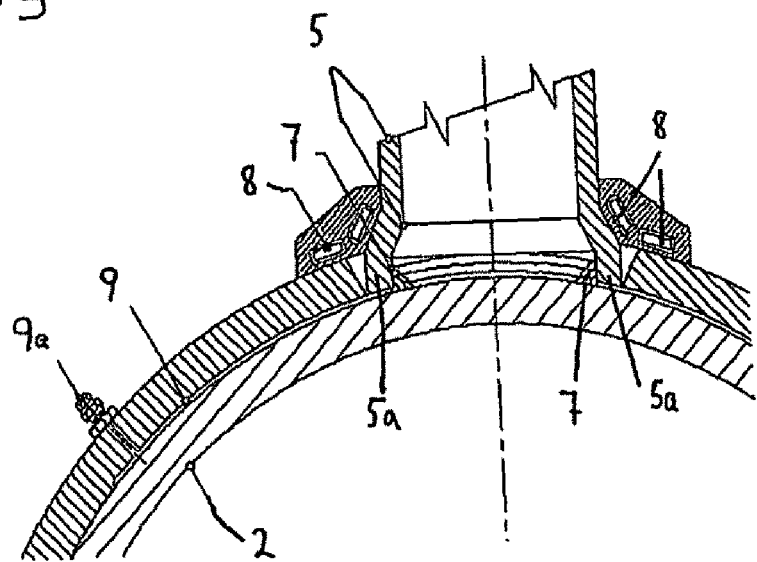
Figure 3:
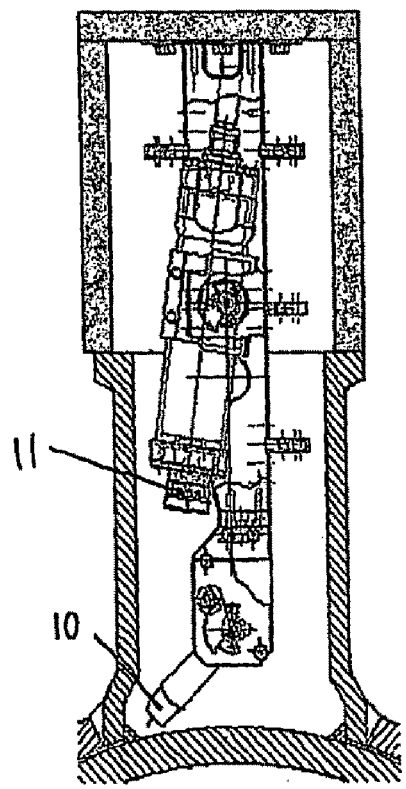

The invention will be further illustrated with drawings, of which the FIGS. 1a, 1b and 1c illustrate the hot tap clamp according to the invention, during installation and as arranged onto a sub sea pipeline, the FIGS. 2a and 2b illustrate cross-sections of the pipeline and the hot tap clamp according to the invention, and the FIG. 3 illustrates a welding head and a monitoring camera mounted inside the pipe socket.

DETAILED DESCRIPTION OF THE PREFERRED EMBODIMENT

The welding is undertaken by MIG-welding or optionally TIG-welding. The welding atmosphere is adapted in composition such that a good welding quality can be achieved, which means that the contents of humidity and potentially hazardous-gases must be kept sufficiently low. The flow rate of the welding atmosphere is controlled accordingly, which means that in particular by MIG-welding a flowrate will be used that ensures a sufficiently low partial pressure of hazardous gases. The pressure of the pipe socket is kept at the ambient pressure or slightly above to avoid ingress of water. The welding atmosphere is preferably delivered from connected equipment through the outer end of the pipe socket and being purged out through the feedthroughs for fluid evacuation.

The hub can for example be a friction based coupling, a grip-type coupling, a forged coupling, a balls/forged-type coupling, a flanged coupling or a machined coupling. Reference is made to Det Norske Veritas "Recommended Practice RP-F104", "Mechanical Pipe Couplings", 1999. Most preferred are clamp based couplings or collet-type couplings, because of simple fastening, feasibility for remote operation and commercial availability (Kværner, Oslo, Norway; Vetco Aibel, Asker, Norway). Even more preferred couplings are expected to become available in the market in the future.

The pipe socket extend outwards from the clamp part, which means that it extends outwards from the clamp part by for example 90°, but the angle can be different, which can be preferable for running a pig through the coupling.

No particular requirements exist as to the cross section of the pipe socket, provided that its inner end abuts the surface of the pipeline such that a good welding connection can be provided. The pipe section can be square or rectangular, or polygonal, but most preferably the pipe socket has a circular cross section. A circular cross section geometry gives a saddle formed welding seam and a minimised length of welding.

The hot tap clamp can be used also on other objects than pipelines, for example on pressure tanks, whereby modification of the clamp can be required to achieve an appropriate fastening.

The hot tap clamp will now be described in further detail with reference to the drawings and the first reference is made to FIG. 1a. On FIG. 1a a hot tap clamp 1 is illustrated, arranged on a pipeline 2. The hot tap clamp comprises a first clamp part 3a, a second clamp part 3b, means 4 for stable fastening of the clamp parts around a section of the pipeline 2, a pipe socket 5 that at an inner end is fixedly integrated with one of the clamp parts and extending outwards from the clamp part to an outer end, and a hub 6 at the outer end of the pipe socket. The FIGS. 1b and 1c illustrate the same hot tap clamp as illustrated on FIG. 1a. On FIG. 1b the clamp is illustrated as open before mounting, and on FIG. 1c the clamp is illustrated as closed after mounting, viewed obliquely from below. One or both clamp parts can be hinged as well. Further reference is made to FIG. 2a, illustrating that the pipe socket at its inner end 5a is going through the clamp part abutting the surface of the pipeline. On FIG. 2a weld seams 7 are also illustrated, as the pipe socket is already welded sealingly to the pipeline by internal welding. Further, means 8 for induction heating of the welding area is illustrated, for preheating of the welding area. Instead of, or in addition to, equipment for preheating mounted external, such equipment can be mounted internal in the pipe socket and clamp part, and around or at the welding head, which will provide a more preferable preheating. In FIG. 2a there is also illustrated a feedthrough for fluid evacuation 9, which also includes a check valve 9a, arranged through the surface of the clamp. Outside the area in the clamp with feedthrough for fluid flow, seals (not illustrated) are preferably arranged, which seals are used with respect to establishment of a hyperbaric welding chamber inside the pipe socket. Remark that neither the seals nor the openings for fluid evacuation are obligatory elements for the hot tap clamp according to the invention, because the clamp without seals will not be completely fluid leak proof and because an appropriate welding atmosphere can be established and maintained by holding a slight overpressure in the pipe socket compared to the ambient pressure, with the pipe socket arranged vertically upwards from the clamp part. Reference is further made to FIG. 2b which illustrates an induction heater 8 arranged with a MIG welding head 10.

Further reference is made to FIG. 3, illustrating a welding head 10 arranged as part of a welding means for automated hyperbaric welding, the welding means being connected to the hub on the outer end of the pipe socket. On FIG. 3 also a monitoring camera 11 for operation together with the welding means is illustrated. The welding head is preferably controlled by using an electric DC-motor controlled manipulator. A data unit will be programmed to control the manipulator so that the welding head can follow the welding groove and provide welding of preferably a saddleformed welding seam around the inner end of the pipe socket. The number of welding passes can be one or several, for example 5, dependent on the welding method and desired safety for the connection. Equipment for atmosphere control, including equipment for purging to remove seawater from the pipe socket and maintenance of a feasible welding atmosphere with appropriate shield gas protection, are not specifically illustrated. Equipment for welding, atmosphere control, monitoring and control are preferably of previously known type, optionally modified to be adapted to the utilisation and geometry within the pipe socket. After completion and acceptance of the weld, by visual control with a monitoring camera, pressure testing, and optional further non-destructive testing, a shut-off valve is connected (for example a ball valve or a gate valve) on the hub, and equipment of previously known type (for example a remotely operated saw or remotely operated milling equipment) for completion of the coupling are arranged above the valve. After sawing out or milling out the wall of the pipeline inside the weld, said equipment are pulled out to a position outside the valve, after which the valve is closed, said equipment are disconnected and the hot tap coupling is ready for connection of a branch pipe.

The invention claimed is:
1. A hot tap clamp, comprising:
   a first clamp part,
   a second clamp part,
   a fastener for stable fastening the clamp parts around a section of a pipeline provided with a hot tap coupling,
   a pipe socket fixedly integrated with one of the clamp parts at an inner end and extending outward from said one clamp part to an outer end, the inner end of the pipe socket passing through the clamp part abutting the surface of the pipeline, such that the pipe socket can be sealingly welded to the pipeline by internal welding, a hub on the outer end of the pipe socket, and internal welding equipment releasably connected to the hub.

2. A hot tap clamp according to claim 1, further comprising seals and at least one feedthrough for fluid evacuation.

3. A hot tap clamp according to claim 1, the internal welding equipment connected to the hub comprising equipment for hyperbaric welding, equipment for atmosphere control and equipment for completing the hot tap coupling.

4. A hot tap clamp according to claim 1, in combination with induction heaters are arranged for preheating of a welding area.

5. A hot tap clamp according to claim 1, wherein the pipe socket has an enlarged internal diameter at its inner end.

6. A hot tap clamp according to claim 1, further comprising a check valve in connection with a feedthrough for fluid evacuation through the clamp surface.

7. A hot tap clamp according to claim 1, further comprising automated equipment for hyperbaric welding.

8. A method of establishing a hot tap coupling on a pipeline, the method comprising:

fastening a first clamp part and a second clamp part around a section of the pipeline to be provided with the hot tap coupling, connecting internal welding equipment to a hub on an outer end of a pipe socket that is fixedly integrated with and extends outward from one of the first clamp part and the second clamp part;

hyperbaric welding an inner end of the pipe socket to a surface of the pipeline using the connected internal welding equipment to form a weld; and milling the surface of the pipeline inside the weld.

* * * * *